(12) United States Patent
Perlman et al.

(10) Patent No.: US 7,200,859 B1
(45) Date of Patent: Apr. 3, 2007

(54) APPARATUS AND METHOD FOR INTELLIGENT MULTIMEDIA COMPRESSION AND DISTRIBUTION

(75) Inventors: Stephen G. Perlman, Palo Alto, CA (US); James B. Nichols, Los Altos, CA (US)

(73) Assignee: Digeo, Inc., Kirkland, WA (US)

( * ) Notice: Subject to any disclaimer, the term of this patent is extended or adjusted under 35 U.S.C. 154(b) by 867 days.

(21) Appl. No.: 09/721,556

(22) Filed: Nov. 22, 2000

(51) Int. Cl.
*H04N 7/173* (2006.01)
*H04N 5/917* (2006.01)

(52) U.S. Cl. .................. 725/133; 386/109; 375/240.01

(58) Field of Classification Search ................ 725/133, 725/132, 131, 134, 139–142, 151–153; 386/83, 386/109–112, 52, 55, 46, 68; 375/240.01
See application file for complete search history.

(56) References Cited

U.S. PATENT DOCUMENTS

| | | | |
|---|---|---|---|
| 4,944,008 A | 7/1990 | Piosenka et al. | |
| 5,146,325 A | 9/1992 | Ng | |
| 5,230,019 A | 7/1993 | Yanagimichi et al. | |
| 5,287,420 A * | 2/1994 | Barrett | 375/240.01 |
| 5,371,551 A | 12/1994 | Logan et al. | |
| 5,444,491 A | 8/1995 | Lim | |
| 5,495,246 A | 2/1996 | Nichols et al. | |
| 5,515,373 A | 5/1996 | Lynch et al. | |
| 5,574,964 A | 11/1996 | Hamlin | |
| 5,584,023 A | 12/1996 | Hsu | |
| 5,627,539 A | 5/1997 | Lynch et al. | |
| 5,631,651 A | 5/1997 | Nichols et al. | |
| 5,634,074 A | 5/1997 | Devon et al. | |
| 5,650,831 A | 7/1997 | Farwell | |
| 5,721,727 A | 2/1998 | Ashi et al. | |
| 5,721,827 A | 2/1998 | Logan et al. | |
| 5,727,233 A | 3/1998 | Lynch et al. | |
| 5,732,216 A | 3/1998 | Logan et al. | |
| 5,734,589 A | 3/1998 | Kostreski et al. | |
| 5,734,862 A | 3/1998 | Kulas | |
| 5,799,190 A | 8/1998 | Lynch et al. | |
| 5,819,298 A | 10/1998 | Wong et al. | |
| 5,826,168 A * | 10/1998 | Inoue et al. | 725/101 |
| 5,838,873 A | 11/1998 | Blatter et al. | |

(Continued)

FOREIGN PATENT DOCUMENTS

EP 0 346700 A2 12/1989

(Continued)

OTHER PUBLICATIONS

PCT International Search Report, PCT/US01/22002, Feb. 14, 2002, 4 pages.

*Primary Examiner*—Vincent F. Boccio
(74) *Attorney, Agent, or Firm*—Kory D. Christensen; Stoel Rives, LLP (57) ABSTRACT

A method and apparatus for storing uncompressed and compressed multimedia content on a storage device, the uncompressed content is stored in an interim buffer of the storage device. Compression of uncompressed content stored in the interim buffer is done as a background task, storing the compressed content in a long term buffer of the storage device, responsive to a user request to record the multimedia content. Automatically stream the uncompressed multimedia content remaining in the interim buffer directly to a rendering device once the compressed multimedia content stored in the long term buffer has been streamed to the rendering device.

10 Claims, 10 Drawing Sheets

U.S. PATENT DOCUMENTS

| | | | |
|---|---|---|---|
| 5,862,220 | A | 1/1999 | Perlman |
| 5,870,477 | A | 2/1999 | Sasaki et al. |
| 5,883,869 | A | 3/1999 | Tamai et al. |
| 5,892,536 | A | 4/1999 | Logan et al. |
| 5,896,444 | A | 4/1999 | Perlman et al. |
| 5,918,013 | A | 6/1999 | Mighdoll et al. |
| 5,931,949 | A | 8/1999 | Perlman et al. |
| 5,938,748 | A | 8/1999 | Lynch et al. |
| 5,940,073 | A | 8/1999 | Klosterman et al. |
| 5,963,909 | A | 10/1999 | Warren et al. |
| 5,978,381 | A | 11/1999 | Perlman et al. |
| 5,983,273 | A | 11/1999 | White et al. |
| 5,986,692 | A | 11/1999 | Logan et al. |
| 6,005,938 | A | 12/1999 | Banker et al. |
| 6,014,693 | A | 1/2000 | Ito et al. |
| 6,014,694 | A | 1/2000 | Aharoni et al. |
| 6,023,585 | A | 2/2000 | Perlman et al. |
| 6,026,079 | A | 2/2000 | Perlman |
| 6,044,396 | A | 3/2000 | Adams |
| 6,049,694 | A | 4/2000 | Kassatly |
| 6,072,872 | A | 6/2000 | Chang et al. |
| 6,073,168 | A | 6/2000 | Mighdoll et al. |
| 6,084,583 | A | 7/2000 | Gerszberg et al. |
| 6,088,455 | A | 7/2000 | Logan et al. |
| RE36,801 | E | 8/2000 | Logan et al. |
| 6,108,422 | A | 8/2000 | Newby et al. |
| 6,118,498 | A | 9/2000 | Reitmeir |
| 6,124,878 | A * | 9/2000 | Adams et al. ............... 725/118 |
| 6,134,590 | A | 10/2000 | Perlman |
| 6,138,147 | A | 10/2000 | Weaver et al. |
| 6,141,356 | A | 10/2000 | Gorman |
| 6,141,693 | A | 10/2000 | Perlman et al. |
| 6,169,879 | B1 | 1/2001 | Perlman |
| 6,188,397 | B1 | 2/2001 | Humpleman |
| 6,199,076 | B1 | 3/2001 | Logan et al. |
| 6,199,114 | B1 | 3/2001 | White et al. |
| 6,223,389 | B1 | 5/2001 | Barton et al. |
| 6,226,241 | B1 | 5/2001 | D'Amato et al. |
| 6,233,389 | B1 | 5/2001 | Barton |
| 6,349,410 | B1 * | 2/2002 | Lortz ........................ 725/134 |
| 6,360,368 | B1 | 3/2002 | Chawla |
| 6,366,731 | B1 | 4/2002 | Na et al. |
| 6,480,667 | B1 * | 11/2002 | O'Connor .................... 386/83 |
| 6,483,986 | B1 * | 11/2002 | Krapf .......................... 386/68 |
| 6,505,299 | B1 | 1/2003 | Zeng et al. |
| 6,526,580 | B2 | 2/2003 | Shimomura et al. |
| 6,578,070 | B1 | 6/2003 | Weaver et al. |
| 6,603,488 | B2 | 8/2003 | Humpleman et al. |
| 6,611,503 | B1 | 8/2003 | Fitzgerald et al. |
| 6,931,658 | B1 * | 8/2005 | Kawamura et al. ........... 386/83 |
| 2003/0088872 | A1 * | 5/2003 | Maissel et al. ................ 725/46 |

FOREIGN PATENT DOCUMENTS

| | | |
|---|---|---|
| EP | 0 364229 A2 | 4/1990 |
| EP | 0 512398 A2 | 11/1992 |
| EP | 0 666694 A1 | 8/1995 |
| EP | 0 676761 A1 | 10/1995 |
| EP | 0 693 727 A1 | 1/1996 |
| EP | 0 714204 A2 | 5/1996 |
| EP | 0 749244 A2 | 12/1996 |
| EP | 0 753964 A1 | 1/1997 |
| EP | 0756393 A1 | 1/1997 |
| EP | 0 773681 A2 | 5/1997 |
| EP | 0 903738 A2 | 3/1999 |
| EP | 0 911962 A1 | 4/1999 |
| EP | 0 971358 A2 | 1/2000 |
| EP | 1 018835 A2 | 7/2000 |
| EP | 1 032195 A2 | 8/2000 |
| EP | 1 056279 A1 | 11/2000 |
| EP | 01 079 581 A2 | 2/2001 |
| EP | 1 143722 A1 | 10/2001 |
| GB | 2 333017 A | 7/1999 |
| WO | WO 99/33265 | 7/1991 |
| WO | WO 96/08912 | 3/1996 |
| WO | WO 99/2253 | 5/1999 |
| WO | WO 99/22513 A2 | 5/1999 |
| WO | WO 00/01149 | 1/2000 |
| WO | WO 00/51129 | 8/2000 |
| WO | WO 01/04893 A2 | 1/2001 |
| WO | WO 01/11865 A1 | 2/2001 |
| WO | WO 01/37546 A6 | 5/2001 |
| WO | WO 01/74079 A1 | 10/2001 |

* cited by examiner

APPARATUS AND METHOD FOR INTELLIGENT MULTIMEDIA COMPRESSION AND DISTRIBUTION

BACKGROUND

1. Field of the Invention

This invention relates generally to the field of multimedia systems. More particularly, the invention relates to a improved multimedia system for compressing and decompressing multimedia content and data using a mass storage device.

2. Description of the Related Art

Figure 1A:
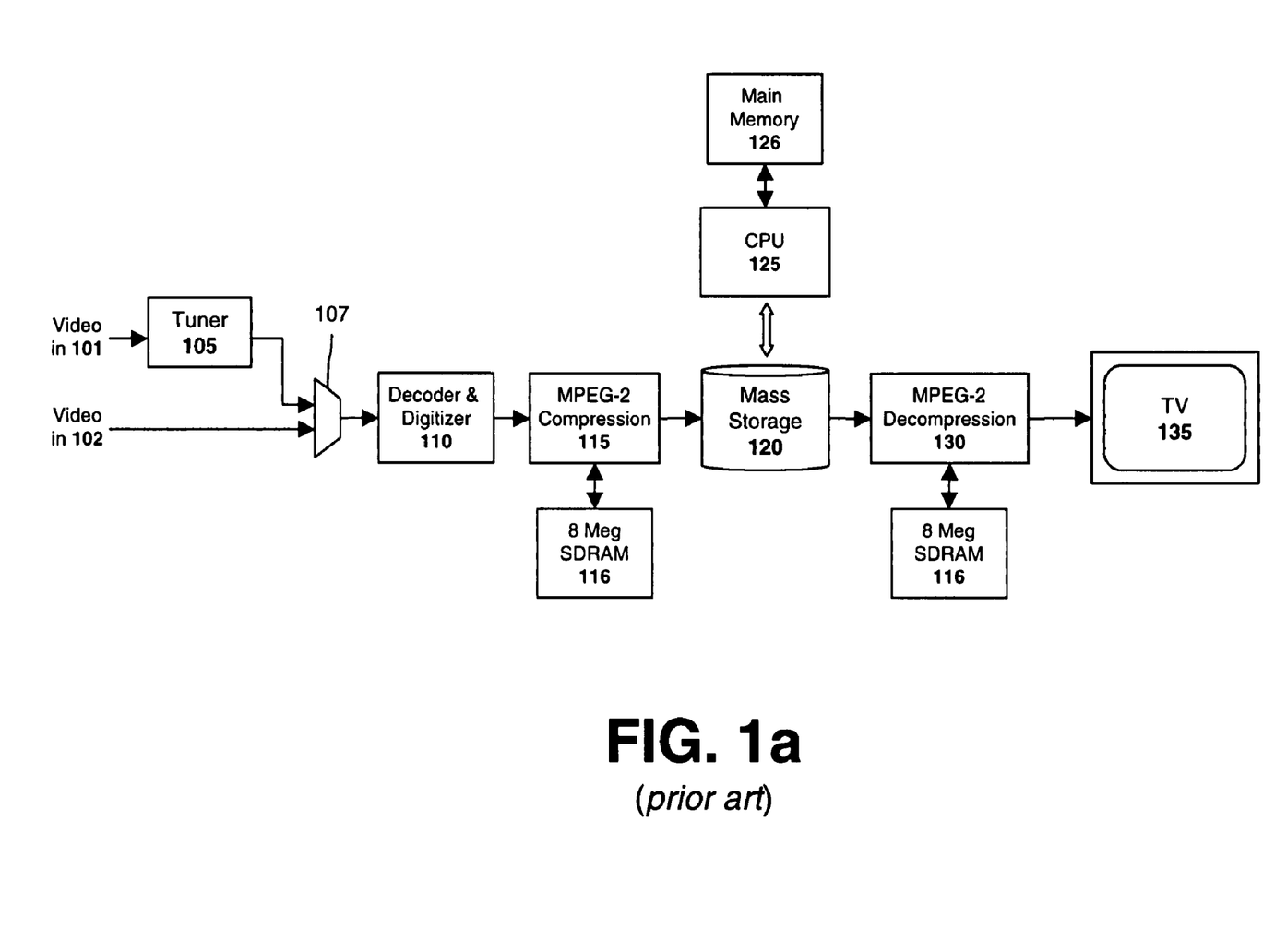
FIGS. 1a and 1b illustrate prior art multimedia storage and playback systems.

A prior art system for receiving and storing an analog multimedia signal is illustrated in FIG. 1a. As illustrated a selector 107 is used to choose between either a baseband video input signal 102 or a modulated input signal 101 (converted to baseband via a tuner module 105). A digitizer/decoder module is 110 performs any necessary decoding of the analog signal and converts the analog signal to a digital signal (e.g., in a standard digital format such as CCIR-601 or CCIR-656 established by the International Radio Consultative Committee).

An MPEG-2 compression module 115 compresses the raw digital signal in order to conserve bandwidth and/or storage space on the mass storage device 120 (on which the digital data will be stored). Using the MPEG-2 compression algorithm, the MPEG-2 compression module 115 is capable of compressing the raw digital signal by a factor of between 20:1 and 50:1 with an acceptable loss in video image quality. However, in order to compress a standard television signal (e.g., NTSC, PAL, SECAM) in real-time, the MPEG-2 compression module 115 requires approximately 8 Mbytes of RAM 116 (typically Synchronous Dynamic RAM or "SDRAM"). Similarly, after the video data has been compressed and stored on the mass storage device 120, the prior art system uses an MPEG-2 decompression module 130 and approximately another 8 Mbytes of memory 116 to decompress the video signal before it can be rendered by a television 135.

Prior art systems may also utilize a main memory 126 for storing instructions and data and a central processing unit ("CPU") 125 for executing the instructions and data. For example, CPU may provide a graphical user interface displayed on the television, allowing the user to select certain television or audio programs for playback and/or storage on the mass storage device 120.

Figure 1B:
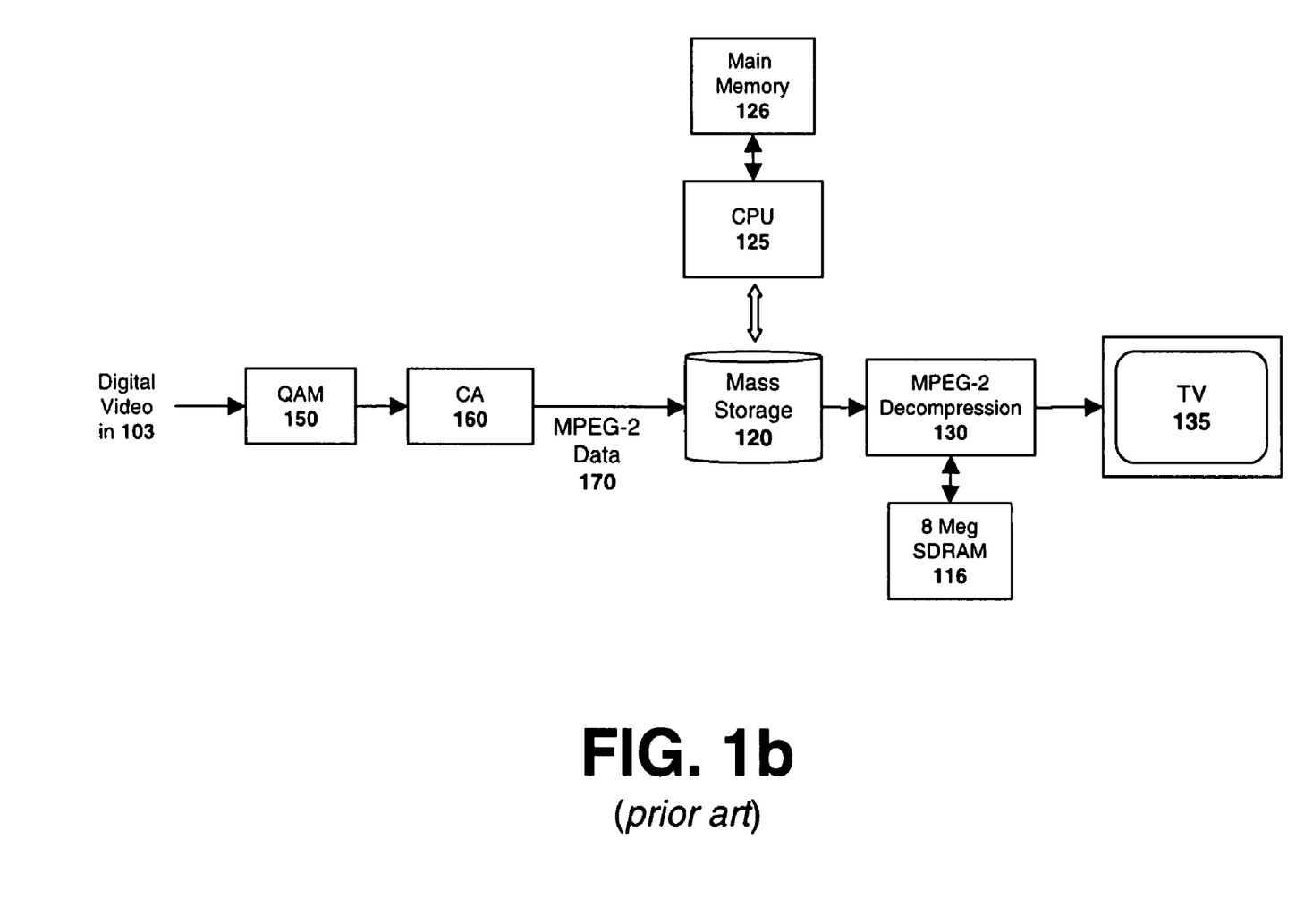

A prior art system for receiving and storing digital multimedia content is illustrated in FIG. 1b. Although illustrated separately from the analog signal of FIG. 1a, it should be noted that certain prior art systems employ components from both the analog system of FIG. 1a and the digital system from FIG. 1b (e.g., digital cable boxes which must support legacy analog cable signals).

As illustrated, the incoming digital signal 103 is initially processed by a quadrature amplitude modulation ("QAM") demodulation module 150 followed by a conditional access ("CA") module 160 (both of which are well known in the art) to extract the underlying digital content. As indicated in FIG. 1b, the digital content is typically an MPEG-2 multimedia stream with a compression ratio selected by the cable TV or satellite company broadcasting the signal. The MPEG-2 data is stored on the mass storage device 120 from which it is read and decompressed by an MPEG-2 decompression module 130 (typically using another 8 Mbytes of RAM) before being transmitted to the television display 135.

One problem associated with the foregoing systems is that the memory and compression logic required to compress and decompress multimedia content in real time represents a significant cost to manufacturers. For example, if 8 Mbytes of SDRAM costs approximately $8.00 and each of the compression and decompression modules cost approximately $20.00 (currently fair estimates), then the system illustrated in FIG. 1a would require $56.00 to perform the compression/decompression functions for a single multimedia stream. Moreover, considering the fact that many of these systems include support for multiple multimedia streams (e.g., two analog streams and two digital streams), the per-unit cost required to perform these functions becomes quite significant.

Another problem with the digital system illustrated in FIG. 1b is that it does not allow users to select a particular compression level for storing multimedia content on the mass storage device 120. As mentioned above, the compression ratio for the MPEG-2 data stream 170 illustrated in FIG. 1b is selected by the digital content broadcaster (e.g., digital cable, satellite, Webcaster, . . . etc). In many cases, however, users would be satisfied with a slightly lower level of video quality if it would result in a significantly higher MPEG-2 compression ratio (and therefore more available storage space on the mass storage device).

Accordingly, what is needed is a more efficient means for compressing and decompressing multimedia content on a multimedia storage and playback device. What is also needed is an apparatus and method which will allow users to select a compression ratio and/or compression type suitable to their needs (e.g., based on a minimum level of quality given the capabilities of their mass storage devices).

SUMMARY OF THE INVENTION

A multimedia apparatus is described comprising: a mass storage device to store uncompressed and compressed multimedia content; and compression logic executed by a processor, the compression logic configured to store uncompressed multimedia content in an interim multimedia buffer on the mass storage device, compress the uncompressed multimedia content as a background task to generate compressed multimedia content, and store the compressed multimedia content in long term multimedia buffer on the mass storage device.

Also described is a computer-implemented method for decreasing the cost of a multimedia storage device comprising: storing multimedia content in an interim multimedia buffer on a mass storage device before compressing the multimedia content; compressing the multimedia content as a background task to generate compressed multimedia content responsive to a user request to record the multimedia content; and storing the compressed multimedia content in long term multimedia buffer on the mass storage device.

Also described is a method implemented on a multimedia storage apparatus comprising: storing digital multimedia content in an interim storage buffer at a first compression ratio, the first compression ratio being the ratio at which the digital multimedia content was transmitted by a multimedia content broadcaster; decompressing the multimedia content; recompressing the multimedia content at a second compression ratio specified by a user, the second compression ratio being higher than the first compression ratio; and storing the recompressed multimedia content in a long term storage buffer.

Also described is a method implemented on a multimedia storage apparatus comprising: storing digital multimedia content in an interim storage buffer at a first compression type, the first compression type being the type at which the digital multimedia content was transmitted by a multimedia content broadcaster; decompressing the multimedia content; recompressing the multimedia content using a second compression type specified by a user to create recompressed multimedia content; and storing the recompressed multimedia content in a long term storage buffer.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Figure 2:
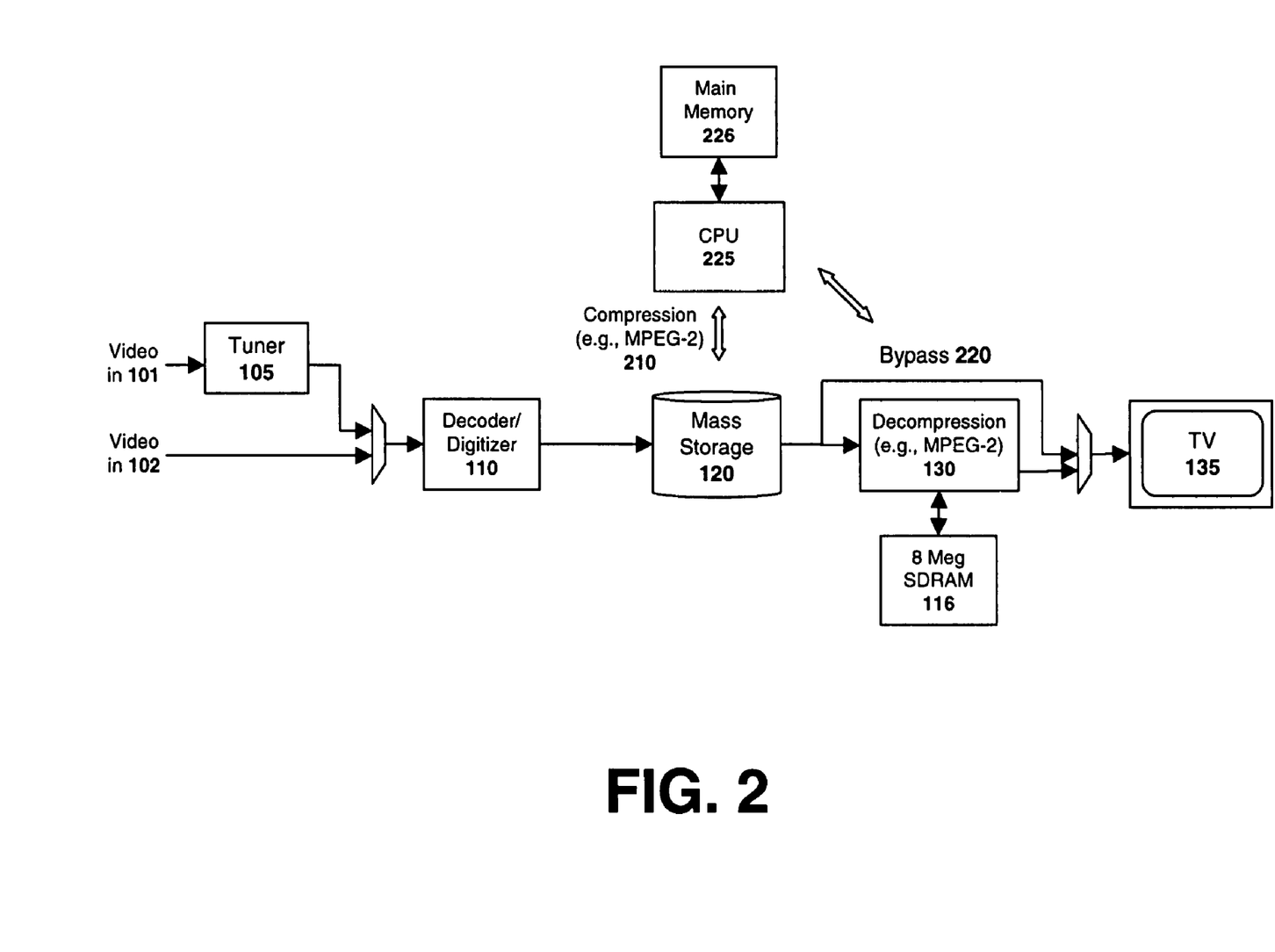
FIG. 2 illustrates one embodiment of a system for intelligent multimedia compression and distribution.

Embodiments of an Apparatus and Method for Intelligent Multimedia Compression and Distribution As shown in FIG. 2, one embodiment of the invention is comprised of one or more tuners 105 for converting an incoming analog signal to a baseband analog signal and transmitting the baseband signal to a decoder/digitizer module 110. The decoder/digitizer module 110 decodes the signal (if required) and converts the signal to a digital format (e.g., CCIR-601 or CCIR-656 established by the International Radio Consultative Committee).

Unlike prior art systems, however, the system illustrated in FIG. 2 transfers the digital content directly to the mass storage device 120 without passing it through an MPEG-2 (or any other) compression module (e.g., such as module 115 in FIG. 1a). Accordingly, the mass storage device 120 has enough capacity to handle the incoming uncompressed digital video stream (uncompressed content will take up significantly more space on the mass storage device 120). In addition, the mass storage device 120 of one embodiment is capable of supporting the bandwidth required by the uncompressed digital video signal. For example, a typical MPEG-2 compressed video signal requires a bandwidth of between 2 Mbits/sec and 5 Mbits/sec, whereas the same signal may require approximately 120 Mbits/sec in an uncompressed format. Therefore, the mass storage device 120 in one embodiment is coupled to the system via an Ultra DMA-66/Ultra ATA-66 or faster interface (capable of supporting a throughput of up to 528 Mbits/sec), and has a storage capacity of 80 Mbytes or greater (by today's standards). It should be noted, however, that the particular interface type/speed and drive storage capacity is not pertinent to the underlying principles of the invention. For example, various different interfaces such as Small Computer System Interface ("SCSI") may be used instead of the Ultra-ATA/Ultra DMA interface mentioned above, and various different drive capacities may be employed for storing the incoming digital content.

Although the digital content is initially stored in an uncompressed format, in one embodiment of the invention, the CPU 225 works in the background to compress the content by executing a particular compression algorithm (e.g., MPEG-2). Accordingly, referring now to FIG. 3, if a user chooses to record a particular television program represented by video input 301 (or other multimedia content), it will initially be stored in an uncompressed data buffer 311 on the mass storage device. However, using the MPEG-2 compression algorithm (or other algorithm as described below), the CPU will work in the background to compress the content and transfer the compressed content to a compressed data buffer 312. Even though the CPU may not have sufficient processing power to compress the incoming data stream in real time (although in some cases it may as described below), it is still capable of compressing the data given a sufficient amount of time to do so (e.g., as a background task). Thus, even a general purpose processor such as an Intel Pentium III®, AMD Althon®, or QED MIPS R5230 processor may be used to compress the multimedia data.

In addition, only a relatively small amount of standard memory 126 is required to perform the compression algorithm due to the fact that, in one embodiment, the system may establish large swap files for working with the multimedia data during the compression and/or decompression procedures (see below). In one embodiment, the swap file configuration may be set by the end user and controlled by an operating system executed on the CPU. For that matter, many of the operations described herein may be scheduled and executed with the aid of a multithreaded, multitasking operating system such as Linux, UNIX, Windows NT®, with realtime and non-realtime multimedia streaming and compression functions built in.

Figure 3:
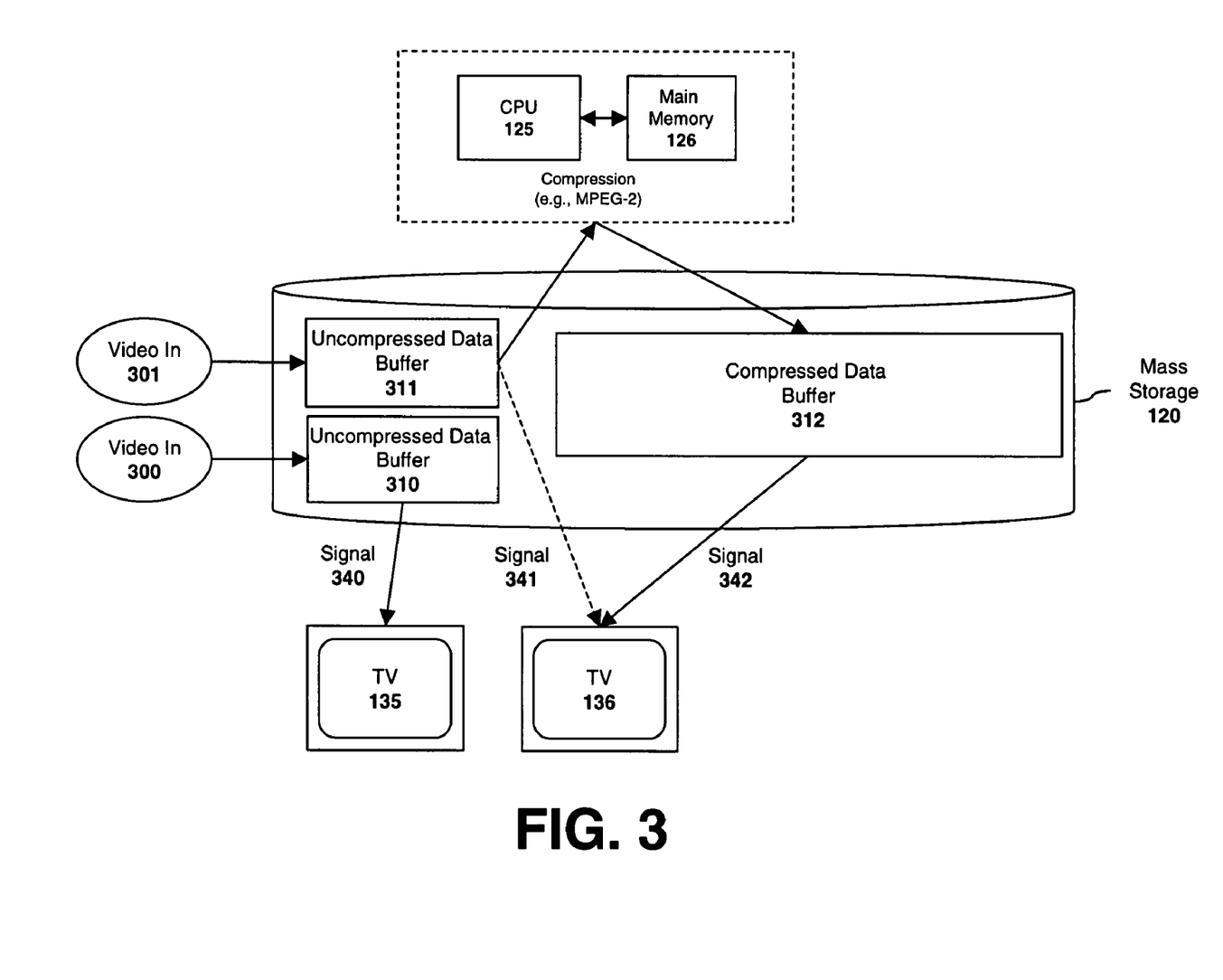
FIG. 3 illustrates coordination between compressed and uncompressed multimedia data according to one embodiment of the invention.

If all of the multimedia content for the multimedia program has been compressed and stored in the compressed data buffer 312 at the time the user attempts to watch the program, then it will be decompressed by the MPEG-2 decompression module 130 before being rendered on the user's television display 136 (represented by signal 342 in FIG. 3). If, however, the program has not been fully compressed (e.g., a percentage of the data is still stored in the uncompressed data buffer), then the portion of the data which is compressed will initially be transmitted to the user through the MPEG-2 decompression module 130 until all the compressed data has been consumed (i.e., until the compressed data buffer is empty). Once the compressed data is consumed, the remaining portion of the program residing in the uncompressed data buffer will be transmitted directly to the television 136 (represented by bypass signal 220). In other words, because the data is uncompressed it does not need to be processed by the MPEG-2 compression module 130.

In one embodiment, a control program executed by the CPU coordinates the data transmissions between the various compressed/uncompressed data buffers 311, 312 and data transmissions from the data buffers 311, 312 to the end user as described above (e.g., the control program may determine when to switch from the compressed data buffer to the uncompressed data buffer).

When a user chooses to watch a live television program or other live multimedia event such as a Webcast (represented by video input 300), one embodiment of the system transmits the incoming multimedia data to an uncompressed data buffer 310 and from the uncompressed data buffer 310 directly to the television 135 or other multimedia rendering device (i.e., signal 340 in FIG. 3). Accordingly, in this embodiment, for live broadcast events no multimedia compression or decompression is required. In addition, the uncompressed data buffer 310 may be configured to store a user-specified amount of data from the live broadcast, thereby providing support for real-time "trick modes" such as pause or rewind for live television. The amount of data stored in the uncompressed data buffer 310 for these purposes may be based on the capacity of the mass storage device employed on the system. For example, a typical uncompressed digital video signal will consume approximately 50 Gbytes/hour. As such, if the system illustrated in FIGS. 2 and 3 employs a 100 Gbyte mass storage device 120, one-quarter of the capacity of the device may be allocated to store ½ hour of live multimedia content with the remaining portion allocated for long term storage (e.g., employing the CPU-based compression techniques described above). In one embodiment, the size of the long term buffer(s) and the live broadcast buffer(s) is configurable by the user. For example, users who have no interest in "trick modes" may allocate all of the mass storage device 120 capacity to long term storage.

In sum, the system described above with respect to FIGS. 2 and 3 provides the same features of prior systems (e.g., trick modes and long term storage of multimedia content) but at a significantly lower cost than prior systems due to the fact that it is capable of performing multimedia compression using a general purpose processor in non-realtime and a high-capacity, high speed mass storage device.

Figure 4:
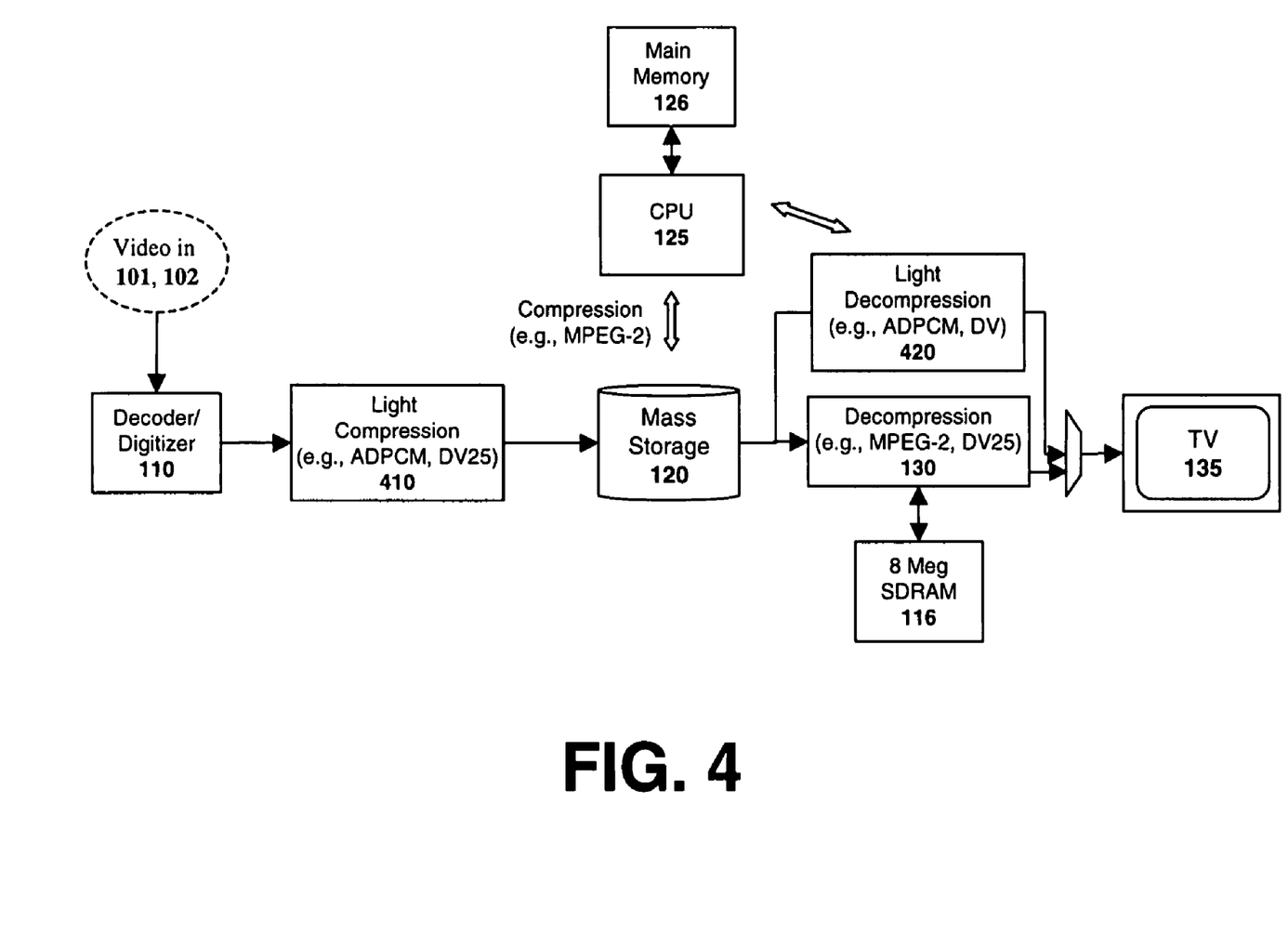
FIG. 4 illustrates one embodiment of the invention employing a light compression algorithm.

A related embodiment of the invention illustrated in FIG. 4 includes a light compression module 410 for compressing the incoming digital signal in real time before the content is stored on the mass storage device 120. The primary difference between the light compression module 410 and the MPEG-2 compression module 115 (FIG. 1*a*), however, is that the light compression module 410 requires less memory and processing logic (i.e., silicon gates) to execute its compression algorithm (and is therefore less costly to manufacture). For example, an adaptive differential pulse code modulation ("ADPCM") algorithm may be employed with as little as 1280 bytes of memory (because ADPCM evaluates entropy between adjacent video pixels rather than several adjacent video frames as does MPEG-2). Although ADPCM is not capable of the same level of compression as MPEG-2, it is still capable of compressing a standard NTSC video signal in real time at a ratio of between 3:1 and 4:1. As such, for a nominal additional expense, the ADPCM compression module 410 and corresponding decompression module 420 will increase the effective capacity of the "uncompressed" data buffers 310, 311 illustrated in FIG. 3 by a multiple of between 3× and 4×. In all other respects, the embodiment illustrated in FIG. 4 may be configured to function in the same manner as the embodiments illustrated in FIGS. 2 and 3. For example, the digital content stored in an ADPCM-compressed format in buffer 311 may be compressed in the background by the CPU 125 using a more intensive compression algorithm such as MPEG-2 and stored in buffer 312. Similarly, for live broadcasts the ADPCM-compressed data may be transmitted from data buffer 310 to the light decompression module 420 for decompression, and then to the user's television 135 (or other multimedia rendering device).

In one particular embodiment, the light compression modules configured in the system provide intra-frame coding/decoding (i.e., compression/coding within each individual video frame) whereas the standard compression and/or decompression modules (e.g., MPEG-2 decompression module 130) provide both inter- and intra-frame coding, using coding techniques between successive frames as well as within each frame (e.g., such as motion compensation and frame differencing for MPEG-2). For example, in one embodiment, the light compression module 410 is configured with the Digital Video ("DV25") compression algorithm for intra-frame coding (see, e.g., the IEC 61834 digital video standard). DV25 compression uses a discrete cosine transform ("DCT") which provides a compression ratio of approximately 5:1. One additional benefit of using DV25 compression in this context is that, because the MPEG-2 module 130 includes DCT logic, the DCT portion of the MPEG-2 decompression module 130 may be used to decompress the DV25-compressed video stream. Accordingly, if DV25 compression is used, a separate light decompression module 420 may not be necessary, thereby further reducing system cost. In addition, the CPU may work in the background to compress the multimedia content using MPEG-2 (which utilizes both inter-frame and intra-frame coding techniques) to achieve a higher compression ratio for long term storage.

It should be noted that various light compression algorithms other than ADPCM and DV25 may be implemented while still complying with the underlying principles of the invention. In fact, the light compression module 410 may use virtually any compression algorithm which requires less memory and/or fewer silicon gates to implement than the "standard" video compression algorithm used in the system (e.g., such as MPEG-2).

Figure 5:
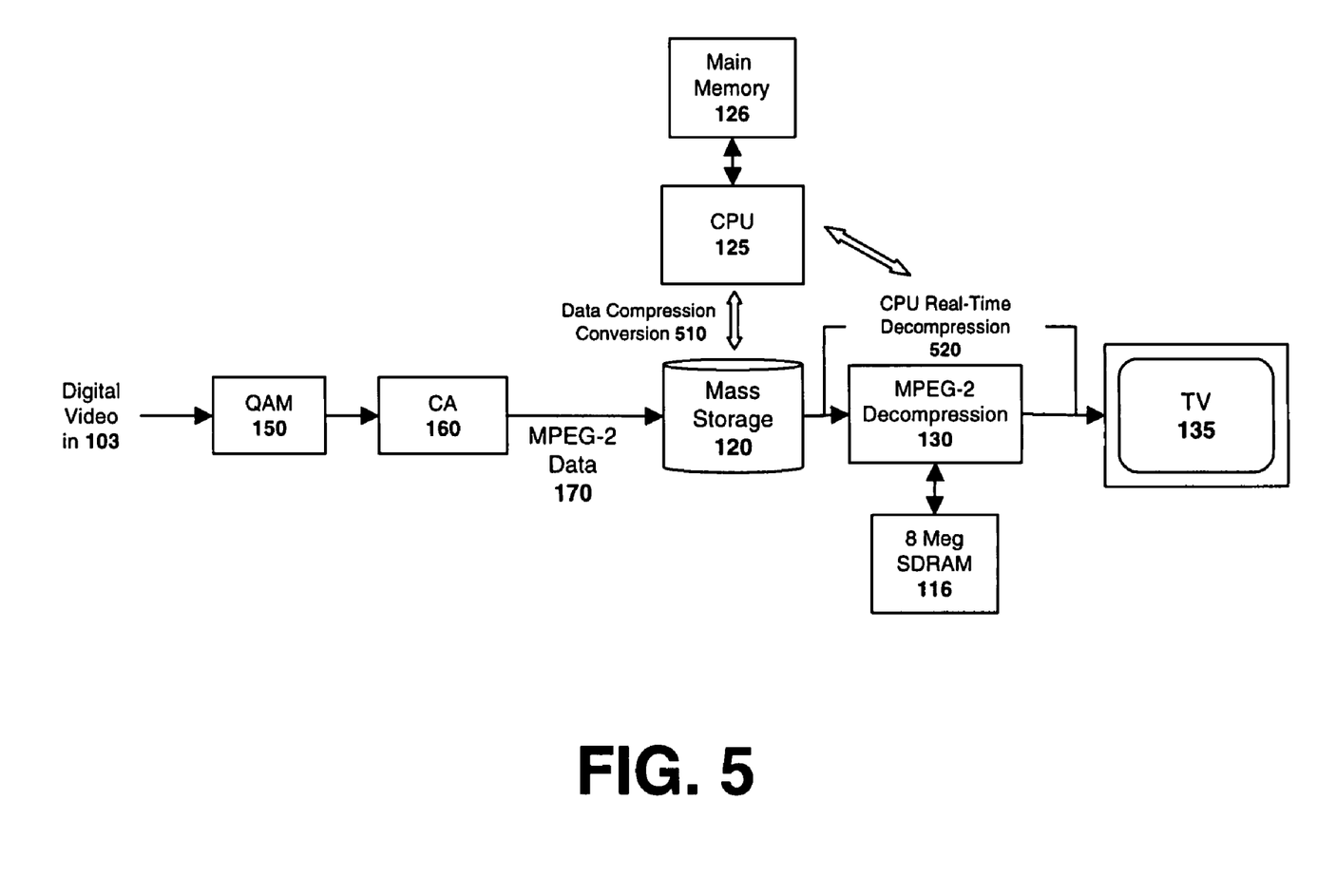
FIG. 5 illustrates one embodiment of the invention for performing data compression conversion on a digital multimedia signal.

FIG. 5 illustrates one embodiment of the invention for compressing and storing a digital multimedia signal 103. The particular embodiment illustrated in FIG. 5 includes a QAM module 150 and a conditional access module 160 for extracting the underlying MPEG-2 data stream 170. The MPEG-2 multimedia stream (or other compressed data stream) is initially stored on the mass storage device 120 as in prior systems. Unlike prior systems, however, the system illustrated in FIG. 5 allows users to specify a data compression ratio other than the compression ratio and/or compression type with which the multimedia content is broadcast. For example, referring also to FIG. 6, in one embodiment, the MPEG-2 stream is initially transmitted to buffer 611 on the mass storage device 120 at the same compression ratio as which it was transmitted—20:1. Certain users, however, may be satisfied with a higher compression level (and corresponding decrease in quality) for everyday television viewing. As such, the illustrated embodiment allows the user to select a higher compression ratio such as 40:1 for specified programs (e.g., programs recorded from a satellite broadcast). As indicated in FIG. 5, the CPU will then work in the background to convert the 20:1 MPEG-2 video to the 40:1 compression ratio. For MPEG-2-compressed data this means that the CPU will decompress the 20:1 MPEG-2 data to raw data (e.g., CCIR-601) and then recompress the raw data using the 40:1 compression algorithm. For other types of multimedia compression, the system may not need to fully decompress and then recompress the entire signal (i.e., the system may simply convert the signal using a conversion algorithm). Once the conversion process is complete, the multimedia content stored in buffer 612 will take up ½ the space on the mass storage device 120.

Figure 6:
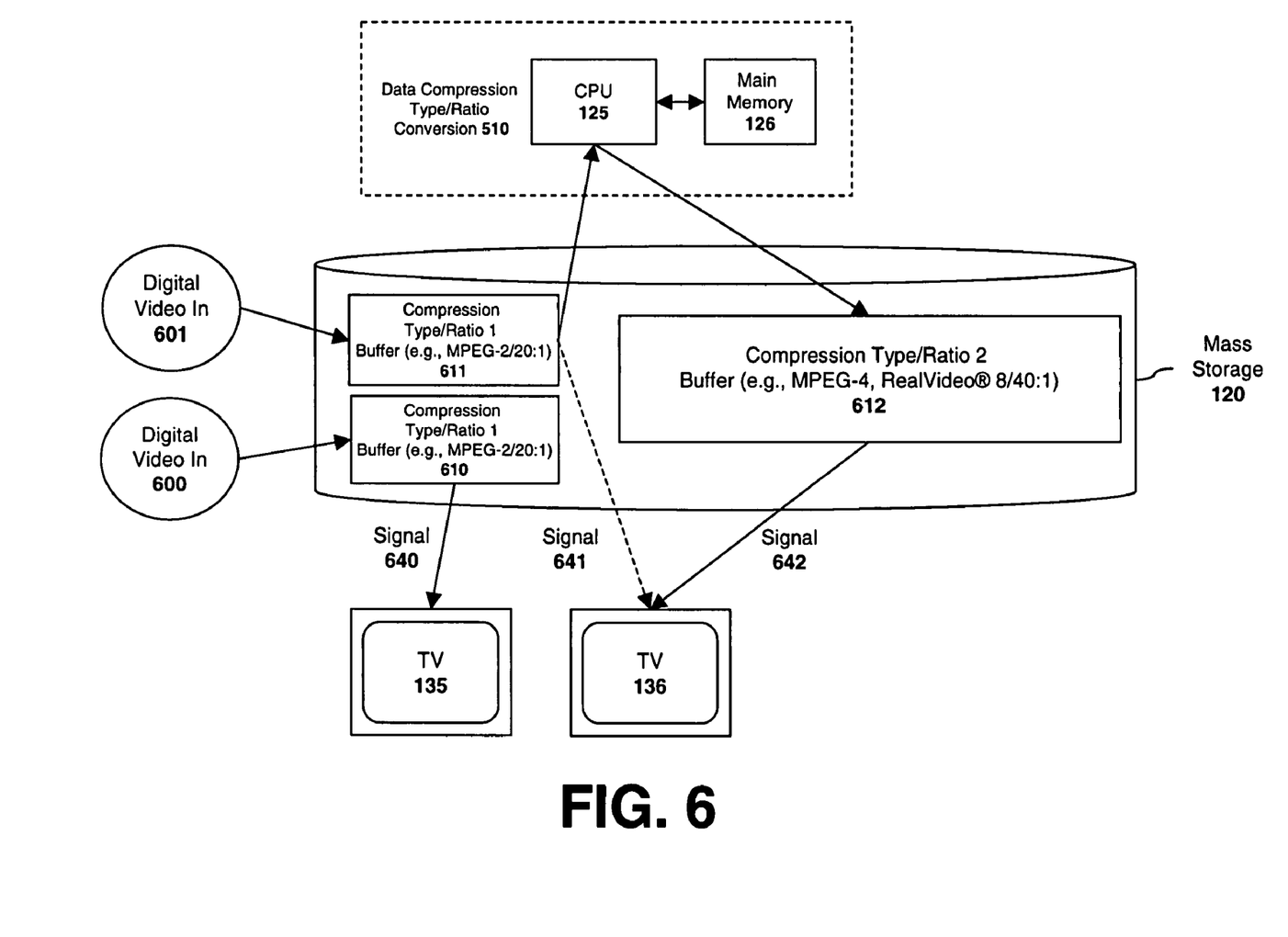
FIG. 6 illustrates compressed and uncompressed buffer coordination according to one embodiment of the invention.

When the user selects the recorded program for viewing, it will be streamed to his television from buffer 612, through the MPEG-2 decompression module 130. If, as described above, the entire background process is not complete when the viewer selects the recorded program (i.e., if only a portion of the 20:1 data has been converted to 40:1 data), then the portion of the data which is compressed and 40:1 and stored in buffer 612 will initially be transmitted to the television (or other display device) until all of the 40:1 compressed data has been consumed (i.e., until the compressed data buffer 612 is empty). Once the 40:1 compressed data is fully consumed, the remaining portion of the data residing in the 20:1 compressed data buffer 611 will be transmitted to the television 136 (represented by signal 641).

Moreover, for live broadcasts (e.g., cable, satellite, Webcast) a user-specified amount of the MPEG-2 data will be stored directly in buffer 610 and streamed to the television 135 through the MPEG-2 decompression module 130 (represented by signal 640), thereby providing support for real-time "trick modes" such as pause or rewind for live television. As described above, the amount of data stored in the 20:1 compressed data buffer 610 for these purposes may be based on the capacity of the mass storage device employed on the system.

Moreover, in one embodiment, users may select a compression type for recorded multimedia programs (i.e., other than the compression type with which the digital signal was broadcast). For example, new compression algorithms such as MPEG-4 and Real Video 8 will achieve a significantly higher compression ratio at the same quality level as MPEG-2. As such, by selecting one of these new compression types, users can free up space on the mass storage device 120 while maintaining the same level of video image quality. Moreover, certain compression types (e.g., Real Video 8) are designed to perform video compression in real time on a general purpose CPU. As indicated in FIG. 5, if one of these CPU-based compression algorithms are selected, the digital content will be read from the storage buffer 612 and decompressed in real-time by the CPU rather than the MPEG-2 decompression module 130.

In other respects, the system works in a similar manner as described above with respect to compression ratio conversion. When the user selects the recorded program for viewing, it will be streamed to his television from buffer 612, and decompressed by the CPU. If, as described above, the entire background process is not complete when the viewer selects the recorded program (i.e., if only a portion of the data has been converted to the new compression type), then the portion of the data in buffer 612 will initially be transmitted to the television (or other display device) until all of the newly-compressed data has been consumed. Then, the remaining portion of the data residing in the standard compression buffer 611 will be transmitted to the television 136 as represented by signal 641. Similarly, for live broadcasts (e.g., cable, satellite, Webcast) a user-specified amount of the MPEG-2 data will be stored directly in buffer 610 and streamed to the television 135 through the MPEG-2 decompression module 130 (represented by signal 640), thereby providing support for real-time "trick modes" such as pause or rewind for live television.

Figure 7A:
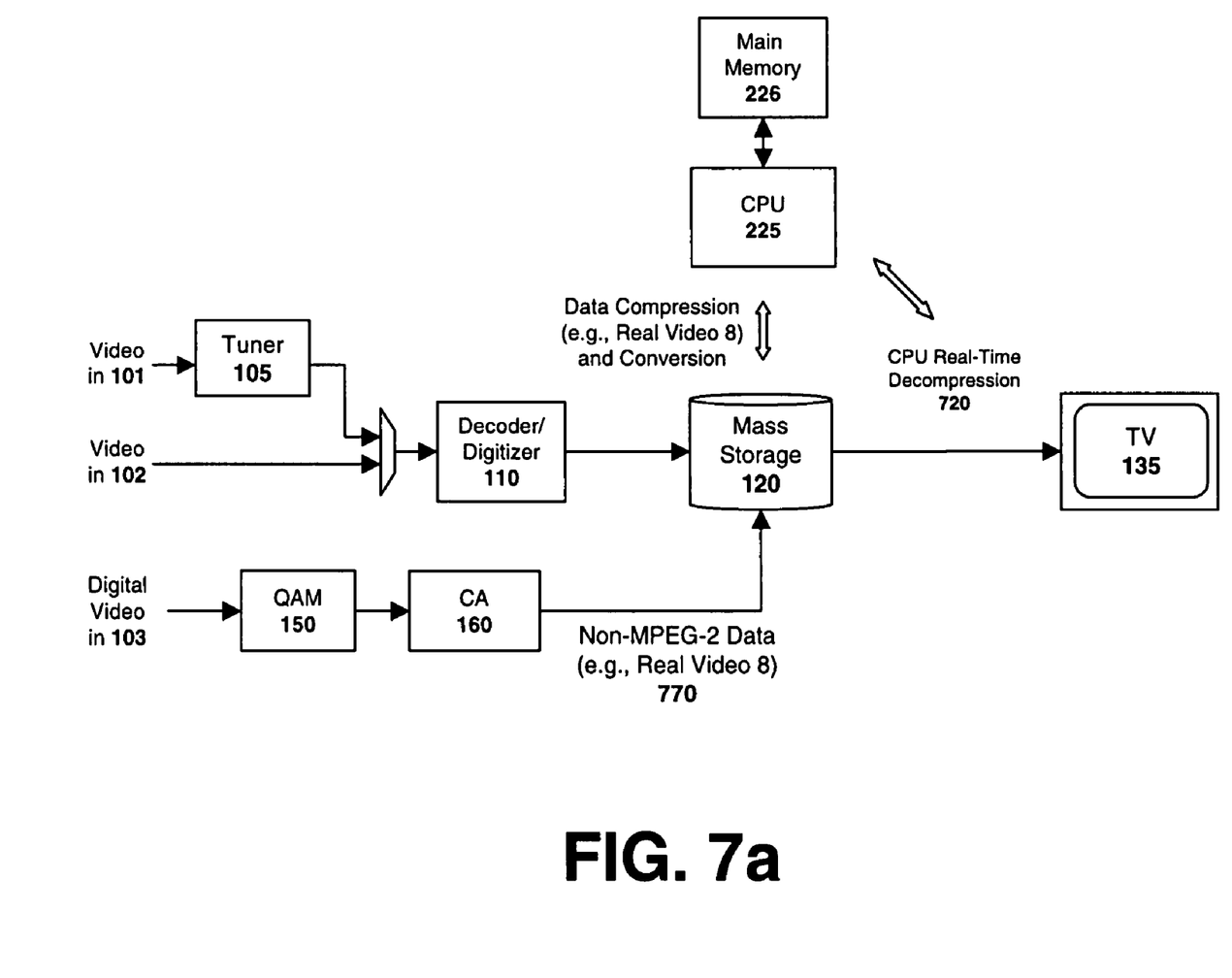
FIGS. 7a–c illustrate embodiments of the invention which employ compression algorithms adapted to be executed in real time using a general purpose processor.

As described above, certain compression algorithms such as Real Video 8 may be executed in real time on a general purpose CPU. Accordingly, FIG. 7a illustrates one embodiment of the invention in which analog video signals 101, 102, after being digitized/decoded, are immediately compressed by the CPU using one of these compression algorithms and stored on the mass storage device 120. Similarly, digital signals 103 may be transmitted by cable and satellite operators using the improved compression algorithm and stored directly on the mass storage device 120, thereby conserving communication bandwidth and storage device 120 space due to the improved data compression ratios. Moreover, as illustrated, no dedicated compression modules and associated memory are required to perform compression and decompression, thereby significantly decreasing manufacturing costs.

As with prior embodiments, users may choose higher or lower compression ratios for recorded multimedia content to conserve space on the mass storage device 120. The user-selected compression ratios may be implemented immediately on the analog signals 101, 102. With respect to the digital signals 103, if the compression ratio selected by the user is different from the compression ratio with which the data is broadcast, then one embodiment of the system will operate as described above, converting the data to the new compression ratio by decompressing and then recompressing the data.

Figure 7B:
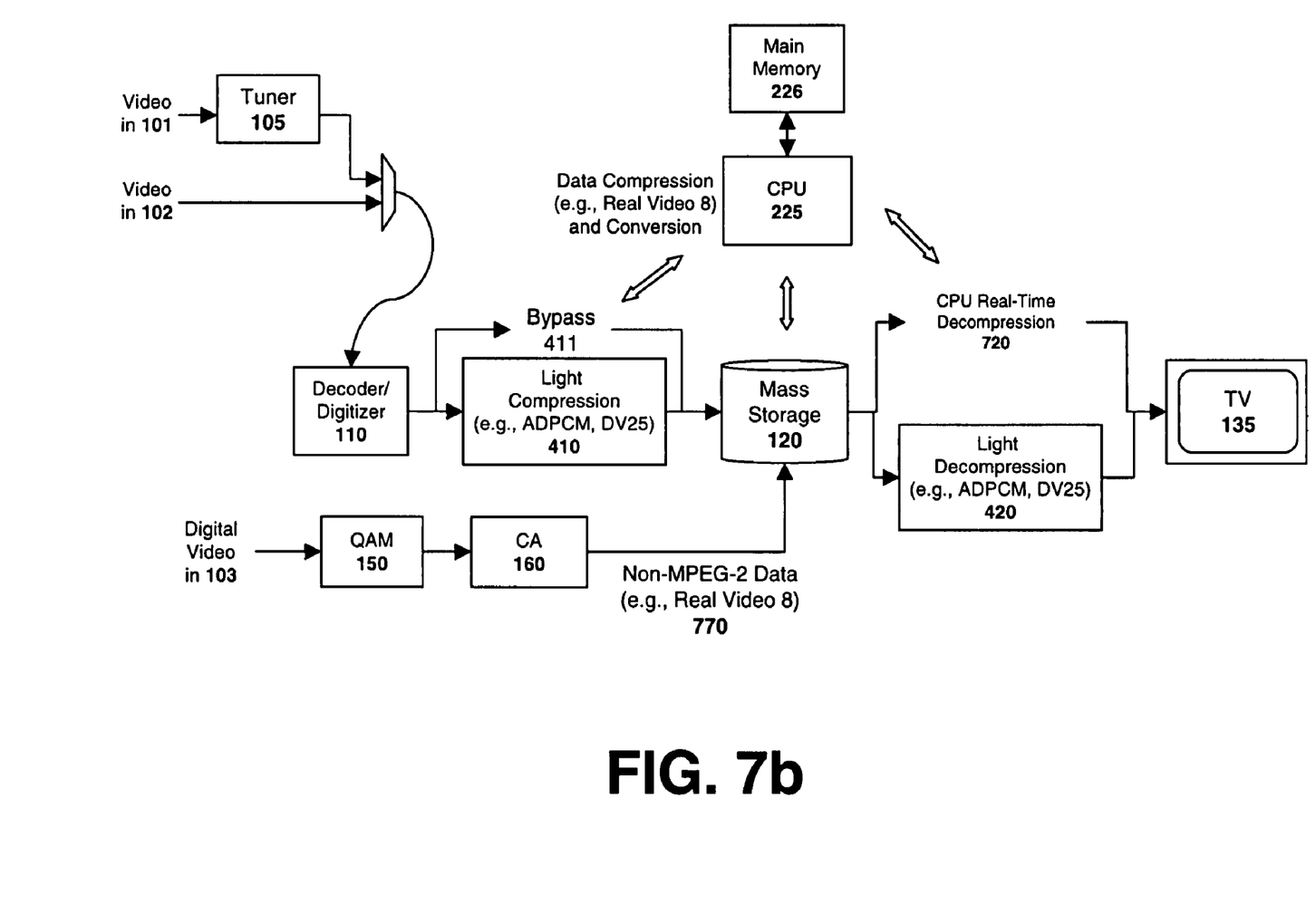

In one embodiment illustrated in FIG. 7b, a light compression module 410 may also be configured in the system to compress the multimedia content in real time before it is stored on the mass storage device 120. The CPU may then work in the background to compress the data using a different algorithm (e.g., Real Video 8). This embodiment is may be employed to free up processing power for other tasks such as compressing/decompressing other multimedia content (e.g., the digital video input 103) using a more processor-intensive compression algorithm. In one embodiment, the light compression module 410 may be used to compress data to support "trick" modes for live broadcasts (e.g., wherein a predetermined amount of live data is stored to support functions such as "pause" and "rewind"), whereas the standard compression and decompression implemented by the CPU may be used for long term multimedia storage.

Figure 7C:
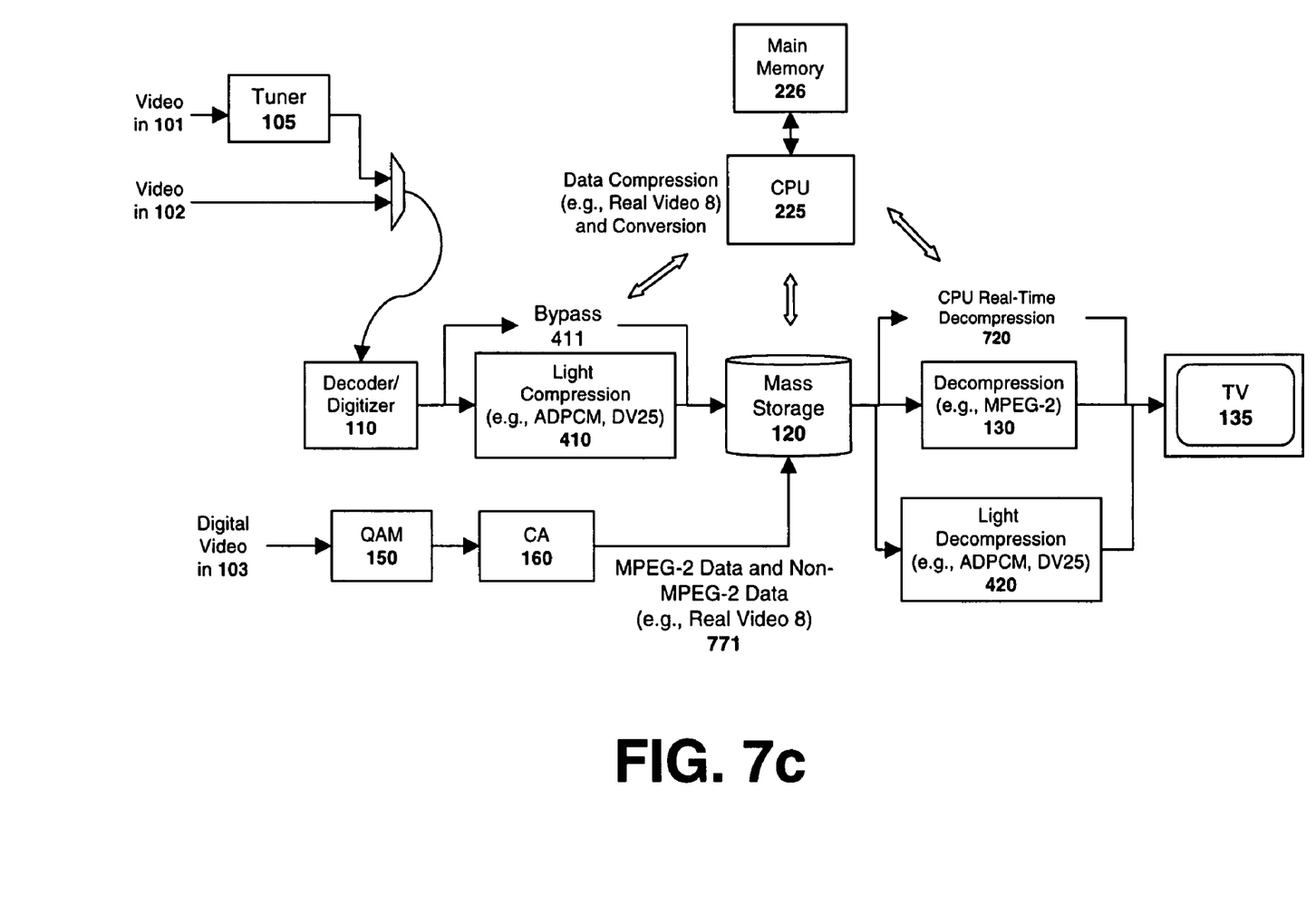

In one embodiment, illustrated in FIG. 7c, both MPEG-2 data and/or non-MPEG-2 data (i.e., signal 771) may be transmitted by the multimedia content provider. Accordingly, this embodiment may include an MPEG-2 decompression module 130 for decompressing the MPEG-2 data in addition to the CPU real-time decompression 720 and/or light decompression module 420. As such, this embodiment may be employed by a variety of different content providers (e.g., digital cable, satellite, Webcast, digital broadcast, . . . etc) regardless of the format in which the content provider transmits the underlying multimedia content. Once again, in one embodiment, the light compression module 410 may be used to compress data for "trick" modes for live broadcasts, whereas the standard compression and decompression (both MPEG-2 and non-MPEG-2) may be used for long term multimedia storage.

In one embodiment, the multimedia content stored in the "trick mode" uncompressed data buffers described herein (e.g., buffer 310) may also be compressed in the background by the CPU and stored in a compressed trick mode buffer (not shown). Similarly, multimedia content may be stored in a first trick mode buffer at a first compression ratio/type (e.g., at which it was transmitted by the multimedia content broadcaster), converted as a background task by the CPU to a second compression ratio/type and stored in a second trick mode buffer. Accordingly, the same techniques described herein with respect to long term multimedia storage may also be applied to live multimedia storage and trick modes (e.g., conversion from one compression ratio/type to another, compressing/decompressing in real time using a general purpose CPU, . . . etc).

It should be noted, that while the foregoing embodiments were described with respect to specific compression algorithms such as Real Video 8 and MPEG, other CPU-based and non-CPU-based compression algorithms (e.g., MPEG-4, AC-3, . . . etc) may be employed while still complying with the underlying principles of the invention. Moreover, although certain analog and digital embodiments were described separately (e.g., in FIG. 2 and FIG. 5, respectively), it will be readily apparent to one of ordinary skill in the art that these embodiments may be combined in a single system (i.e., capable of receiving and processing both analog and digital signals using the techniques set forth above).

Moreover, it will be appreciated that several multimedia streams may be processed concurrently by the system (depending, in part, on the speed at which the mass storage device can read/write data). For example, two live streams may be transmitted concurrently through two separate "trick mode" buffers. At the same time, two recorded streams may be temporarily stored in interim buffers and processed in the background by the CPU (e.g., from a first compression ratio/type to a second compression ratio type). In addition, the streams may be transmitted from the multimedia storage system to the rendering devices (e.g., televisions) over a variety of different data transmission channels/media, including both terrestrial cable (e.g., Ethernet) and wireless (e.g., 802.11b).

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. In other instances, well known structures and functions were not described in detail in order to avoid obscuring the subject matter of the present invention. Accordingly, the scope and spirit of the invention should be judged in terms of the claims which follow.

What is claimed is:

1. A multimedia apparatus comprising:
   a mass storage device to store uncompressed and compressed multimedia content; and
   compression logic executed by a processor, said compression logic configured to:
   store uncompressed multimedia content in an interim multimedia buffer on said mass storage device,
   compress said uncompressed multimedia content stored in said interim multimedia buffer as a background task to generate compressed multimedia content responsive to a user request to record said multimedia content,
   store said compressed multimedia content in long term multimedia buffer on said mass storage device, and
   automatically stream said uncompressed multimedia content remaining in said interim multimedia buffer directly to a multimedia rendering device once said compressed multimedia content stored in said long term multimedia buffer has been streamed to said rendering device.

2. The multimedia apparatus as in claim 1 wherein said compression logic is further configured to:
   stream said compressed multimedia content from said long term multimedia buffer to a decompression module and then to a multimedia rendering device responsive to a user request to view said multimedia content.

3. The multimedia apparatus as in claim 1 wherein said multimedia content is broadcast video content.

4. The multimedia apparatus as in claim 3 wherein said broadcast video content is transmitted from a cable television provider.

5. The multimedia apparatus as in claim 3 wherein said broadcast video content is a Webcast transmitted over a data network.

6. A computer-implemented method for decreasing the cost of a multimedia storage device comprising:
   storing multimedia content in an interim multimedia buffer on a mass storage device before compressing said multimedia content;
   compressing said multimedia content stored in said interim multimedia buffer as a background task to generate compressed multimedia content responsive to a user request to record said multimedia content;
   storing said compressed multimedia content in long term multimedia buffer on said mass storage device; and
   automatically streaming said uncompressed multimedia content remaining in said interim multimedia buffer directly to a multimedia rendering device once said compressed multimedia content stored in said long term multimedia buffer has been streamed to said rendering device, if any uncompressed multimedia content remains in said interim data buffer when said long term storage buffer is empty.

7. The method as in claim 6 further comprising streaming said compressed multimedia content from said long term multimedia buffer to a decompression module and then to a multimedia rendering device responsive to a user request to view said multimedia content.

8. The method as in claim 6 wherein said multimedia content is broadcast video content.

9. The method as in claim 8 wherein said broadcast video content is transmitted from a cable television provider.

10. The method as in claim 8 wherein said broadcast video content is a Webcast transmitted over a data network.

* * * * *